United States Patent
Gebreselassie et al.

(10) Patent No.: US 6,710,133 B2
(45) Date of Patent: Mar. 23, 2004

(54) RECYCLABLE VEHICLE INTERIOR ARTICLES AND METHODS OF MAKING SAME

(75) Inventors: Girma Gebreselassie, Southfield, MI (US); Matt Starling, Ypsilanti, MI (US); Surendra Khambete, West Bloomfield, MI (US); Graham Tompson, Northville, MI (US)

(73) Assignee: Collins & Aikman Products Co., Troy, MI (US)

( * ) Notice: Subject to any disclaimer, the term of this patent is extended or adjusted under 35 U.S.C. 154(b) by 117 days.

(21) Appl. No.: 10/041,223

(22) Filed: Jan. 7, 2002

(65) Prior Publication Data

US 2003/0096099 A1 May 22, 2003

Related U.S. Application Data

(60) Provisional application No. 60/337,666, filed on Nov. 7, 2001.

(51) Int. Cl.[7] .............................. C08K 3/00; C08K 3/26; C08L 23/00; C08L 23/04
(52) U.S. Cl. ...................... 525/240; 525/241; 524/423; 524/425
(58) Field of Search ................................. 525/240, 241; 524/423, 425

(56) References Cited

U.S. PATENT DOCUMENTS

| | | | |
|---|---|---|---|
| 5,322,335 A | 6/1994 | Niemi | 296/97.23 |
| 6,103,803 A | 8/2000 | Cheung et al. | 524/425 |
| 6,187,424 B1 | 2/2001 | Kjellqvist et al. | 428/220 |
| 6,254,956 B1 | 7/2001 | Kjellqvist et al. | 428/44 |
| 6,319,969 B1 | 11/2001 | Walther et al. | 524/300 |
| 6,417,276 B2 * | 7/2002 | Dubensky et al. | 525/191 |

* cited by examiner

*Primary Examiner*—Nathan M. Nutter
(74) *Attorney, Agent, or Firm*—Myers Bigel Sibley & Sajovec

(57) ABSTRACT

Recyclable vehicle interior trim panels, and methods of producing same, are provided. A vehicle interior trim panel may include a top layer of recyclable polymeric material and a backing layer bonded to the top layer in face-to-face relationship. The top layer includes a blend of various recyclable polymeric materials including an interpolymer component, a polypropylene copolymer component, a polypropylene component, a limestone component, and barium sulfate component, and has a thickness of between about 1.6 mm and about 2.0 mm. The top layer may include first and second layers of recyclable polymeric material adhered together in face-to-face relationship. The first layer includes a first interpolymer component, a second interpolymer component, a polypropylene copolymer component, a polypropylene component, a polyethylene polymer component, and a silicone component. The second layer includes an interpolymer component, a polypropylene copolymer component, a polypropylene component, and a limestone component.

22 Claims, 2 Drawing Sheets

RECYCLABLE VEHICLE INTERIOR ARTICLES AND METHODS OF MAKING SAME

RELATED APPLICATIONS

This application claims the benefit of U.S. Provisional Application No. 60/337,666, filed Nov. 7, 2001, the disclosure of which is incorporated herein by reference in its entirety as if set forth fully herein.

FIELD OF THE INVENTION

The present invention relates generally to vehicles and, more particularly, to vehicle interior trim articles.

BACKGROUND OF THE INVENTION

It is generally desirable for vehicle interior articles, such as floor coverings, instrument panel skins, door panel skins, consoles, and pillars, etc., to have an attractive appearance, to maintain their shape and resist wear over long periods of use, and to provide sound absorption within a vehicle interior. In addition, due to increasing federal environmental regulations and decreasing availability of landfill space, there is increased interest in recycling post-consumer products such as vehicle interior trim panels. Unfortunately, many conventional vehicle interior articles are formed from non-recyclable materials such as thermosetting resins, which cannot be re-melted and reused.

Thus, there is a need for recyclable vehicle interior articles that have durable, tough surfaces, that are impervious to water and most chemicals, and that are designed to be scratch and mar resistant. In addition, there is a need for recyclable vehicle interior articles that can reduce external noises (e.g., road noise, engine noise, vibrations, etc.), as well as noises emanating from within passenger compartments, while also being lightweight and low in cost.

SUMMARY OF THE INVENTION

In view of the above discussion, recyclable vehicle interior articles for use in a variety of interior trim applications (e.g., floor coverings, instrument panel skins, door panel skins, consoles, and pillars, etc.), and methods of producing same, are provided. According to embodiments of the present invention, vehicle interior articles include a top layer of recyclable polymeric material and a backing layer bonded to the top layer in face-to-face relationship. The top layer includes a blend of various recyclable polymeric materials and has a thickness of between about 1.6 mm and about 2.0 mm. According to an embodiment of the present invention, the top layer includes an interpolymer component having a composition of about sixty to eighty percent (60%–80%) ethylene and about twenty to forty percent (20%–40%) aromatic vinyl monomer, a polypropylene/ethylene copolymer component, a polypropylene component, a limestone component, and barium sulfate component. Various additional components including distilled petroleum products, zinc stearate, pigments, and regrind/recycle materials may also be used.

According to other embodiments of the present invention, vehicle interior articles include a top layer of recyclable polymeric material and a backing layer attached to the top layer in face-to-face relationship. The top layer includes first and second layers of recyclable polymeric material adhered together in face-to-face relationship. The first layer includes a first interpolymer component having a composition of about twenty to forty percent (20%–40%) ethylene and about sixty to eighty percent (60%–80%) aromatic vinyl monomer, a second interpolymer component having a composition of about sixty to eighty percent (60%–80%) ethylene and about twenty to forty percent (20%–40%) aromatic vinyl monomer, a polypropylene/ethylene copolymer component, a polypropylene component, a polyethylene polymer component, and a silicone component. The second layer includes an interpolymer component having a composition of about sixty to eighty percent (60%–80%) ethylene and about twenty to forty percent (20%–40%) aromatic vinyl monomer, a polypropylene copolymer component, a polypropylene component, and a limestone component.

The first layer has a thickness of between about 0.75 mm and about 1.0 mm. The second layer has a thickness of between about 1.0 mm and about 1.25 mm. Accordingly, the top layer has a thickness of between about 1.75 mm and about 2.25 mm.

Vehicle interior articles according to embodiments of the present invention may be used in a wide variety of vehicle applications including, but not limited to floor coverings, instrument panel skins, door panel skins, consoles, and pillars, etc. Vehicle trim panels embodying aspects of the present invention are thinner in cross section and, thus, are lighter in weight than conventional vehicle trim panels. In addition, trim panels according to embodiments of the present invention can achieve various performance characteristics including wear resistance, sound absorption, colorability, etc., that are superior to conventional vehicle trim panels. Moreover, vehicle trim panels according to embodiments of the present invention are environmentally friendly in that they can be recycled.

BRIEF DESCRIPTION OF THE DRAWINGS

The accompanying drawings, which form a part of the specification, illustrate key embodiments of the present invention. The drawings and description together serve to fully explain the invention.

DETAILED DESCRIPTION OF THE INVENTION

Figure 1A:
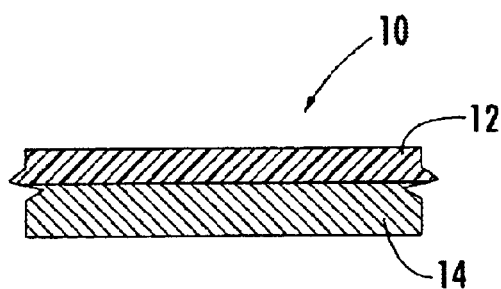
FIG. 1A is a partial cross-sectional view of a vehicle interior trim panel, according to embodiments of the present invention, that includes a top layer of recyclable polymeric material and a backing layer bonded to the top layer in face-to-face relationship.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element such as a layer, region, substrate, or panel is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present.

Embodiments of the present invention provide sound attenuating composite articles for use in various applications, particularly automotive applications. Exemplary automotive applications within which sound attenuating composite articles according to embodiments of the present invention may be utilized include, but are not limited to, carpeting for floors, door panels, and other interior portions, and upholstery for various interior portions, such as headliners, dashboards, etc.

As is understood by those skilled in this art, the attenuation of external noise is conventionally referred to as sound transmission loss (STL). The attenuation of internal noise is conventionally referred to as sound absorption. The acoustic impedance of a material is defined as material density times acoustic velocity, and is expressed in units of Rayls (Newton-seconds/meter$^3$). Acoustic impedance defines how easy it is for air to move through a material. Thus, for fibrous materials, acoustic impedance depends upon the density of the fibrous material and fiber diameter. Generally, the heavier the blanket and the finer the fibers, the higher the acoustic impedance. Moreover, thicker layers typically have more acoustic impedance than thin layers. The ability of a material to attenuate noise is conventionally defined by the material's STL, acoustic impedance, and absorption characteristics.

For the purposes of the present invention, the term "aromatic vinyl monomer" is to be broadly interpreted and includes, for example, aryl and heterocyclic monomers. Exemplary aromatic vinyl monomers which may be employed include, for example, styrene and styrene derivatives such as alpha-methyl styrene, p-methyl styrene, vinyl toluene, ethylstyrene, tert-butyl styrene, monochlorostyrene, dichlorostyrene, vinyl benzyl chloride, vinyl pyridine, fluorostyrene, alkoxystyrenes (e.g., paramethoxystyrene), and the like, along with blends and mixtures thereof. In addition to the composition range stated herein, the aromatic vinyl monomer may be used in an amount, based on total weight of the monomers, preferably from about five to fifty percent (5%–50%) by weight, and most preferably from about ten to forty percent (10%–40%) by weight. A particularly preferred aromatic vinyl monomer is styrene.

Referring initially to FIG. 1A, a vehicle interior article 10, according to embodiments of the present invention, includes a top layer 12 of recyclable polymeric material and a backing layer 14 bonded to the top layer 12 in face-to-face relationship. The top layer 12 and backing layer 14 may be bonded or attached together in various ways, such as via adhesives, heat, extrusion, molding, etc. The interior article 10 may be used in various vehicle interior applications including, but not limited to floor coverings, instrument panel skins, door panel skins, consoles, and pillars, etc.

The top layer 12 includes a blend of various recyclable polymeric materials and has a thickness of between about 1.6 mm and about 2.0 mm. According to an embodiment of the present invention, the top layer includes an interpolymer component having a composition of about sixty to eighty percent (60%–80%) ethylene and about twenty to forty percent (20%–40%) aromatic vinyl monomer, a polypropylene/ethylene copolymer component, a polypropylene component, a filler component (e.g., limestone and/or barium sulfate). Various additional components including distilled petroleum products, dispersing agents (e.g., zinc stearate), pigments, and regrind/recycle materials may also be used. Preferable material compositions and quantities for the top layer 12 that can be utilized in accordance with embodiments of the present invention are set forth in Table 1 below.

TABLE 1

| Component | Commercial Name/Manufacturer | % By Weight |
|---|---|---|
| Interpolymer: 70% ethylene and 30% styrene | DE 200.01/Dow Chemical | 38–42% |
| Polypropylene/ethylene copolymer | Inspire 112/Dow Chemical | 4–6% |
| Polypropylene | H700-12 NPH/Dow Chemical | 13–17% |
| Limestone (CaCO$_3$) | | 25–30% |
| Barium sulfate (BaSO$_4$) | | 5–10% |
| Distilled petroleum | Shellflex 6702 | 3–5% |
| Zinc stearate | | 0.2–0.6% |
| Pigment | Clariant | 0.5–1% |
| Regrind/recycle | | 0–35% |

However, different material quantities may be utilized. Embodiments of the present invention are not limited to only the listed ranges of material quantities.

An interpolymer used in accordance with embodiments of the present invention has good filler absorption characteristics. A polypropylene copolymer used in accordance with embodiments of the present invention enhances low temperature performance and allows the top layer 12 to pass various low temperature flexibility requirements. Moreover, the polypropylene/ethylene copolymer can also improve shrinkage characteristics of the top layer 12 which enhances the ability to be easily thermoformable. A polypropylene according to embodiments of the present invention has a melt index of 12 and works in conjunction with the other polypropylene components to achieve desired hardness and elasticity of the top layer 12. Limestone is used as a low cost filler and barium sulfate is used to increase specific gravity, which enhances sound attenuation characteristics of the top layer 12. Barium sulfate also increases resistance to tear, elongation, scuff, and abrasion. Other fillers known to those skilled in the art may be used.

A distilled petroleum product, such as Shellflex 6702, acts as a lubricant in machinery processing the top layer composition and facilitates compounding. Zinc stearate is used to improve filler dispersion and can also increase surface resistance to scuffing. Various polypropylene-based pigments are utilized to produce desired colors. Regrind/recycle material can be used, but is kept separate by color to prevent contamination. The backing layer 14 is a normal filled material.

Figure 1B:
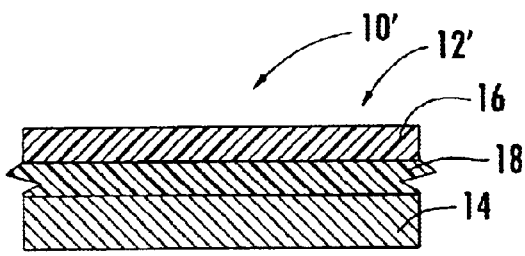
FIG. 1B is a partial cross-sectional view of the vehicle interior trim panel of FIG. 1A, wherein the top layer comprises first and second layers of recyclable polymeric material, according to embodiments of the present invention.

Referring to FIG. 1B, a vehicle interior article 10', according to embodiments of the present invention, includes a top layer of recyclable polymeric material and a backing layer 14 attached to the top layer 12' in face-to-face relationship. The top layer 12' includes first and second layers 16, 18 of recyclable polymeric material adhered together in face-to-face relationship. The interior article 10' may be used in various vehicle interior applications including, but not limited to floor coverings, instrument panel skins, door panel skins, consoles, and pillars, etc.

The first layer 16, includes a first interpolymer component having a composition of about twenty to forty percent (20%–40%) ethylene and about sixty to eighty percent (60%–80%) aromatic vinyl monomer, a second interpolymer component having a composition of about sixty to eighty percent (60%–80%) ethylene and about twenty to forty percent (20%–40%) aromatic vinyl monomer, a polypropylene/ethylene copolymer component, a polypropylene component, a polyethylene component, and a silicone component. The first layer 16, has a thickness of between about 0.75 mm and about 1.0 mm.

Exemplary material compositions and quantities for the first layer 16 that can be utilized in accordance with embodiments of the present invention are set forth in Table 2 below.

TABLE 2

| Component | Commercial Name/Manufacturer | % By Weight |
| --- | --- | --- |
| Interpolymer: 70% ethylene and 30% styrene | DE 200.01/Dow Chemical | 25–30% |
| Interpolymer: 30% ethylene and 70% styrene | DE 201.01/Dow Chemical | 25–30% |
| Polypropylene/ethylene copolymer | Inspire 112/Dow Chemical | 5–10% |
| Polypropylene | H700-12 NPH/Dow Chemical | 20–25% |
| Polyethylene | Dowlex 2045/Dow Chemical | 5–10% |
| Silicone | DMB 1200.1/Dow-Corning | 3–5% |
| Pigment | Clariant | 3–5% |

The second layer 18, includes an interpolymer component having a composition of about sixty to eighty percent (60%–80%) ethylene and about twenty to forty percent (20%–40%) aromatic vinyl monomer, a polypropylene copolymer component, a polypropylene component, and a limestone component. The second layer 18 has a thickness of between about 1.0 mm and about 1.25 mm. Accordingly, the top layer 12' has a thickness of between about 1.75 mm and about 2.25 mm.

Exemplary material compositions and quantities for the second layer 18 that can be utilized in accordance with embodiments of the present invention are set forth in Table 3 below.

TABLE 3

| Component | Commercial Name/Manufacturer | % By Weight |
| --- | --- | --- |
| Interpolymer: 70% ethylene and 30% styrene | DE 200.01/Dow Chemical | 25–30% |
| Polypropylene/ethylene copolymer | Inspire 112/Dow Chemical | 2–4% |
| Polypropylene | H700–12 NPH/Dow Chemical | 5–10% |
| Limestone ($CaCO_3$) | | 55–60% |
| Distilled petroleum | Shellflex 6702 | 4–6% |
| Zinc stearate | | 0.2–0.6% |

TABLE 3-continued

| Component | Commercial Name/Manufacturer | % By Weight |
| --- | --- | --- |
| Pigment | Clariant | 0.5–1% |
| Regrind/recycle | | 0–35% |

However, different material quantities may be utilized for the first and second layers 16, 18. Embodiments of the present invention are not limited to only the listed ranges of material quantities.

Using a two layer construction for the top layer 12' can provide increased cost benefits in materials as well as improving abrasion and scuff performance versus the single top layer construction of FIG. 1A. The material in the first and second layers 16, 18 is fully recyclable and can be colored at a lower cost since the first layer 16 is thin and contains no fillers. The use of a first layer 16 also allows for the omission barium sulfate from the formula.

According to other embodiments of the present invention, the backing layer 14 in FIGS. 1A–1B may be an open cell material, such as would be known to those skilled in the art. According to other embodiments, the backing layer 14 in FIGS. 1A–1B may be a polypropylene foam sheet.

Figure 2A:
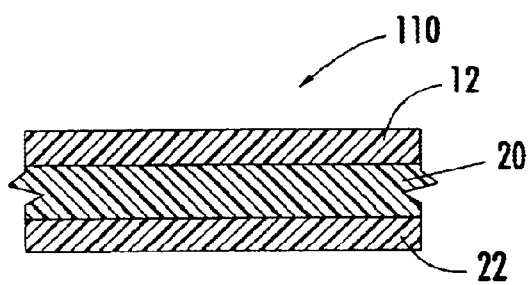
FIG. 2A is a partial cross-sectional view of a vehicle interior trim panel, according to embodiments of the present invention, that includes a top layer of recyclable polymeric material that comprises first and second layers of recyclable polymeric material, a middle layer of recyclable polymeric material, and a backing layer that are bonded together in face-to-face relationship.

Referring now to FIG. 2A, a vehicle interior article 110, according to embodiments of the present invention, includes a top layer 12 of recyclable polymeric material, a middle layer 20 of recyclable polymeric material bonded to the top layer 12 in face-to-face relationship, and a bottom layer 22 of recyclable polymeric material bonded to the middle layer 14 in face-to-face relationship. The top, middle, and bottom layers 12, 20, 22 may be bonded together in various ways, such as via adhesives, heat, extrusion, molding, etc.

The top layer 12 includes a blend of various recyclable polymeric materials and has a thickness of between about 1.6 mm and about 2.0 mm. According to an embodiment of the present invention, the top layer includes an interpolymer component having a composition of about sixty to eighty percent (60%–80%) ethylene and about twenty to forty percent (20%–40%) aromatic vinyl monomer, a polypropylene/ethylene copolymer component, a polypropylene component, a limestone component, and barium sulfate component. Various additional components including distilled petroleum products, zinc stearate, pigments, and regrind/recycle materials may also be used. Exemplary material compositions and quantities for the top layer 12 that can be utilized in accordance with embodiments of the present invention are set forth in Table 1 above. The middle layer 20 may be a polypropylene foam sheet or an open cell material such as would be known to those skilled in the art. The bottom layer 22 may be a polypropylene filled reinforced substrate.

Figure 2B:
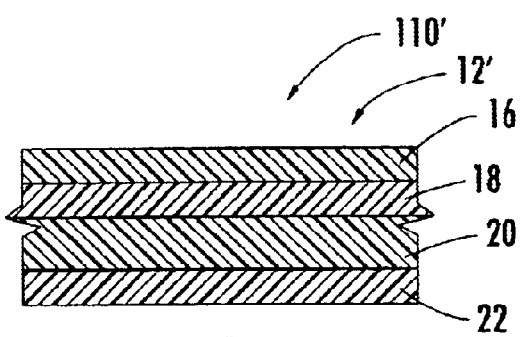
FIG. 2B is a partial cross-sectional view of the vehicle interior trim panel of FIG. 2A, wherein the top layer comprises first and second layers of recyclable polymeric material, according to embodiments of the present invention.

Referring to FIG. 2B, a vehicle interior article 110', according to embodiments of the present invention, includes a top layer 12' of recyclable polymeric material, a middle layer 20 of recyclable polymeric material bonded to the top layer 12 in face-to-face relationship, and a bottom layer 22 of recyclable polymeric material bonded to the middle layer 14 in face-to-face relationship. The top, middle, and bottom layers 12', 20, 22 may be bonded together in various ways, such as via adhesives, heat, extrusion, molding, etc.

The top layer 12' includes first and second layers 16, 18 of recyclable polymeric material adhered together in face-to-face relationship. The first layer 16 includes a first interpolymer component having a composition of about twenty to forty percent (20%–40%) ethylene and about sixty to eighty percent (60%–80%) aromatic vinyl monomer, a second interpolymer component having a composition of about sixty to eighty percent (60%–80%) ethylene and about twenty to forty percent (20%–40%) aromatic vinyl monomer, a polypropylene/ethylene copolymer component, a polypropylene component, a polyethylene polymer component, and a silicone component. The first layer 16, has a thickness of between about 0.75 mm and about 1.0 mm. Exemplary material compositions and quantities for the first layer 16 that can be utilized in accordance with embodiments of the present invention are set forth in Table 2 above.

The second layer 18, includes an interpolymer component having a composition of about sixty to eighty percent (60%–80%) ethylene and about twenty to forty percent (20%–40%) aromatic vinyl monomer, a polypropylene/ ethylene copolymer component, a polypropylene component, and a limestone component. The second layer 18 has a thickness of between about 1.0 mm and about 1.25 mm. Accordingly, the top layer 12' has a thickness of between about 1.75 mm and about 2.25 mm. Exemplary material compositions and quantities for the second layer 18 that can be utilized in accordance with embodiments of the present invention are set forth in Table 3 above. The middle layer 20 may be a polypropylene foam sheet or an open cell material such as would be known to those skilled in the art. The bottom layer 22 may be a polypropylene filled reinforced substrate.

Figure 3:
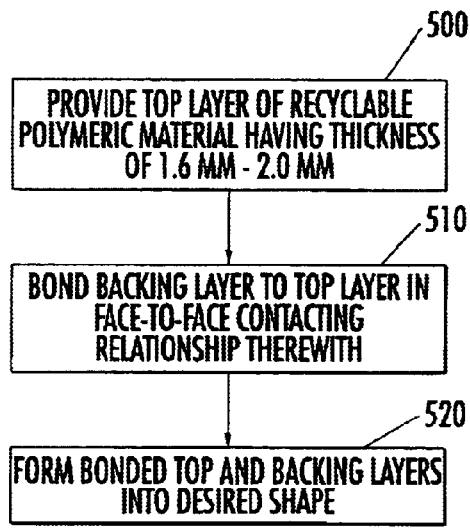
FIGS. 3–6 are schematic diagrams that illustrate methods of producing vehicle interior trim panels according to embodiments of the present invention.

Referring now to FIG. 3, a schematic diagram is provided that illustrates methods of producing a vehicle interior trim panel according to embodiments of the present invention. Initially, a top layer of recyclable polymeric material having a thickness of between about 1.6 mm and about 2.0 mm and having the following components is provided: an interpolymer component having a composition of about sixty to eighty percent (60%–80%) ethylene and about twenty to forty percent (20%–40%) aromatic vinyl monomer, a polypropylene/ethylene copolymer component, a polypropylene component, a filler component (e.g., limestone and/or barium sulfate), distilled petroleum products, a dispersion agent, pigments, and regrind/recycle materials may (Block 500). Exemplary material compositions and quantities for the top layer 12 that can be utilized in accordance with embodiments of the present invention are set forth in Table 1 above.

A backing layer is bonded to the top layer of recyclable polymeric material in face-to-face contacting relationship therewith (Block 510). The backing layer may be formed from various materials including, but not limited to, polypropylene foam sheet material, and open cell materials. The bonded top and backing layers are then formed into a desired shape (Block 520) using any of various known techniques, such as compression molding or vacuum forming.

Figure 4:
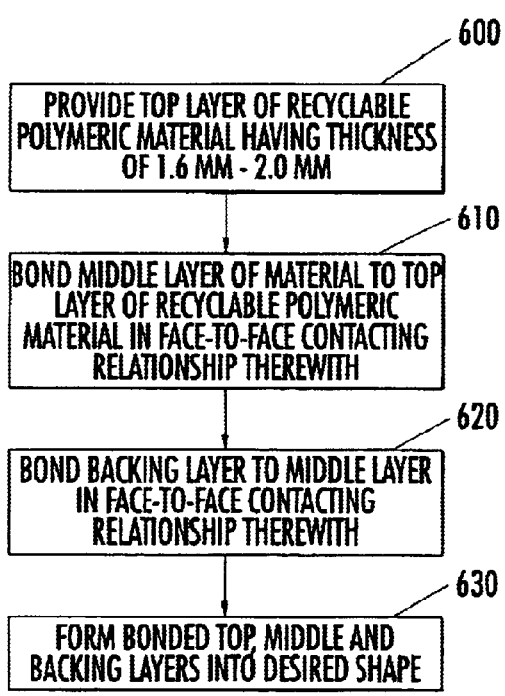

Referring now to FIG. 4, a schematic diagram is provided that illustrates methods of producing a vehicle interior trim panel according to other embodiments of the present invention. Initially, a top layer of recyclable polymeric material having a thickness of between about 1.6 mm and about 2.0 mm and having the following components is provided: an interpolymer component having a composition of about sixty to eighty percent (60%–80%) ethylene and about twenty to forty percent (20%–40%) aromatic vinyl monomer, a polypropylene/ethylene copolymer component, a polypropylene component, a filler component (e.g., limestone and/or barium sulfate), distilled petroleum products, a dispersion agent, pigments, and regrind/recycle materials may (Block 600). Exemplary material compositions and quantities for the top layer 12 that can be utilized in accordance with embodiments of the present invention are set forth in Table 1 above.

A middle layer of material is bonded to the top layer of recyclable polymeric material in face-to-face contacting relationship therewith (Block 610). The middle layer may be formed from various materials including, but not limited to, polypropylene foam sheet material, and open cell materials. A reinforced polypropylene substrate is then attached to the backing layer in face-to-face contacting relationship therewith (Block 620). The combined top layer, middle layer, and substrate are then formed into a desired shape (Block 630) using any of various known techniques, such as compression molding or vacuum forming.

Figure 5:
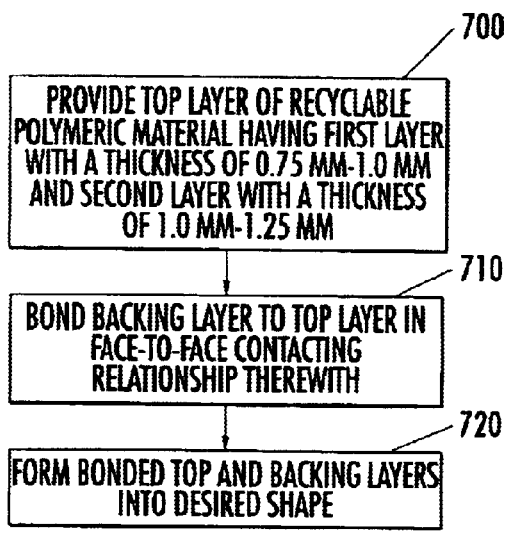

Referring now to FIG. 5, a schematic diagram is provided that illustrates methods of producing a vehicle interior trim panel according to embodiments of the present invention. Initially, a top layer is formed from first and second layers of recyclable polymeric material, which are bonded together in face-to-face relationship (Block 700). The first layer of recyclable polymeric material includes a first interpolymer component having a composition of about twenty to forty percent (20%–40%) ethylene and about sixty to eighty percent (60%–80%) aromatic vinyl monomer, a second interpolymer component having a composition of about sixty to eighty percent (60%–80%) ethylene and about twenty to forty percent (20%–40%) aromatic vinyl monomer, a polypropylene copolymer component, a polypropylene component, a polyethylene polymer component, and a silicone component. The first layer has a thickness of between about 0.75 mm and about 1.0 mm. Exemplary material compositions and quantities for the first layer that can be utilized in accordance with embodiments of the present invention are set forth in Table 2 above.

The second layer of recyclable polymeric material includes an interpolymer component having a composition of about sixty to eighty percent (60%–80%) ethylene and about twenty to forty percent (20%–40%) aromatic vinyl monomer, a polypropylene copolymer component, a polypropylene component, and a limestone component. The second layer has a thickness of between about 1.0 mm and about 1.25 mm. Accordingly, the top layer has a thickness of between about 1.75 mm and about 2.25 mm. Exemplary material compositions and quantities for the second layer that can be utilized in accordance with embodiments of the present invention are set forth in Table 3 above.

A backing layer is bonded to the top layer of recyclable polymeric material in face-to-face contacting relationship therewith (Block 710). The backing layer may be formed from various materials including, but not limited to, polypropylene foam sheet material, and open cell materials. The bonded top and backing layers are then formed into a desired shape (Block 720) using any of various known techniques, such as compression molding or vacuum forming.

Figure 6:
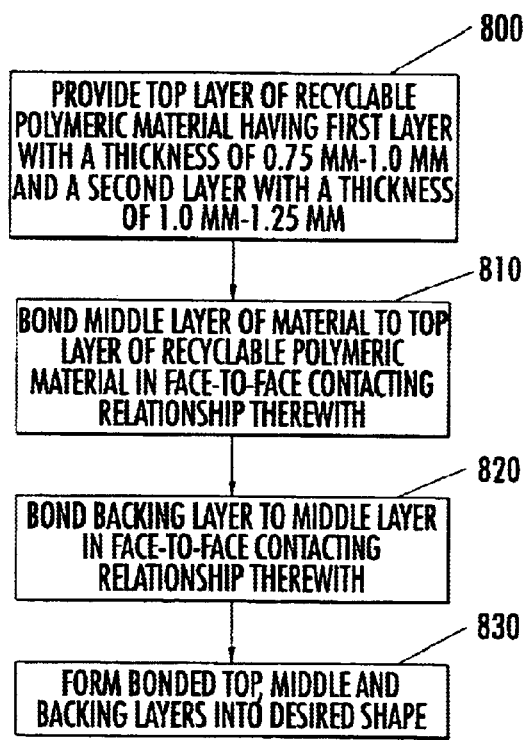

Referring now to FIG. 6, a schematic diagram is provided that illustrates methods of producing a vehicle interior trim panel according to other embodiments of the present invention. Initially, a top layer is formed from first and second layers of recyclable polymeric material, which are bonded together in face-to-face relationship (Block 800). The first layer of recyclable polymeric material includes a first interpolymer component having a composition of about twenty to forty percent (20%–40%) ethylene and about sixty to eighty percent (60%–80%) aromatic vinyl monomer, a second interpolymer component having a composition of about sixty to eighty percent (60%–80%) ethylene and about twenty to forty percent (20%–40%) aromatic vinyl monomer, a polypropylene/ethylene copolymer component, a polypropylene component, a polyethylene polymer component, and a silicone component. The first layer has a thickness of between about 0.75 mm and about 1.0 mm. Exemplary material compositions and quantities for the first layer that can be utilized in accordance with embodiments of the present invention are set forth in Table 2 above.

The second layer of recyclable polymeric material includes an interpolymer component having a composition of about sixty to eighty percent (60%–80%) ethylene and about twenty to forty percent (20%–40%) aromatic vinyl monomer, a polypropylene/ethylene copolymer component, a polypropylene component, and a limestone component. The second layer has a thickness of between about 1.0 mm and about 1.25 mm. Accordingly, the top layer has a thickness of between about 1.75 mm and about 2.25 mm. Exemplary material compositions and quantities for the second layer that can be utilized in accordance with embodiments of the present invention are set forth in Table 3 above.

A middle layer of material is bonded to the top layer of recyclable polymeric material in face-to-face contacting relationship therewith (Block 810). The middle layer may be formed from various materials including, but not limited to, polypropylene foam sheet material, and open cell materials. A reinforced polypropylene substrate is then attached to the backing layer in face-to-face contacting relationship therewith (Block 820). The combined top layer, middle layer, and substrate are then formed into a desired shape (Block 830) using any of various known techniques, such as compression molding or vacuum forming.

EXAMPLE 1

The following illustrates a method of producing a vehicle floor covering having a single layer of recyclable material, according to embodiments of the present invention.

| Vehicle Flooring - Single Layer | | |
|---|---|---|
| Inspect & Receive Raw Materials | Transfer Materials | Compounding Extruder |
| DE 200.01 | | Set Extruder up to match Process Parameters for SLZ |
| Inspire 112 | | FOR EXAMPLE |
| H700-12NPH | | Extruder Zone Temperatures - 330–440 F. |
| CaCO3 | | Die Zones - 330–380 F. |
| BaSO4 | | Set Die Gap to meet 1.7–2.0 mm sheet thickness criteria |
| Shelflex 6702 | | Set Feed rates to material hoppers to match SLZ formulation |
| Zinc Stearate | | Set Screw Speed - RPM's and AMP Draw Trim part to 68–78" width - Part Dependent! |
| Match Materials to physical specification on supplier C&C - verify criteria | | |
| Set Sheeting line up to match Process Parameters for SLZ Set Fomer to match Process Parameters for SLZ | | |
| Sheeting Line FOR EXAMPLE | | Vac Forming FOR EXAMPLE |
| Line Speed - FPM Roll Stack Gap - 1.7–2.0 mm Thickness criteria | | Blank Length - 90" Material Oven D well - 35 seconds |
| Roll stack temperatures - top–bottom 210–240 F. | | Material Maximum Temperature - 350 F. Top Oven - 100% Bottom Oven - 50–80% |
| Foam or Fiber Attachment | | Water Jet or Trimming |
| Attach OEM desired component | | Trim part of OEM criteria on OEM vehicle drawings |
| Apply adhesive attach fiber | | Set cycle time to match one step flow of process |
| FOR FOAM - Set Up to SLZ Parameters | | Attach clips, etc. |
| Material Tempratures - 85–100 F. | | Remove excess material and place in recycling |
| Material Ratio 0.95–1.1 | | Verify proper cut and clean part as required |
| Shot Size - 4–10 Seconds | | |
| Inspect and Ship | | |
| Verify part matches all OEM criteria Place part on trimming inspection buck to verify trimming operation Label product accordingly Place part in shipping container Transfer to shipping Ship product | | |

EXAMPLE 2

The following illustrates a method of producing a vehicle floor covering having two layers of recyclable material, according to embodiments of the present invention.

| Vehicle Flooring - Two Layers | | | |
|---|---|---|---|
| Inspect & Receive Raw Materials | | Transfer Materials | Compounding Coextruder |
| Bottom Layer | Top Layer | | Set Extruder up to match Process Parameters for DLZ |
| DE 200.01 | DE 200.01 | | FOR EXAMPLE |
| Inspire 112 | DS 201.01 | | Set both Extruder Zone Temperatures - 330–440 F. |
| H700-12NPH | Inspire 112 | | Die Zones - 330–380 F. |
| CaCO3 | H700-12NPH | | Set Die Gap to meet 1.7–2.0 mm sheet thickness criteria |
| Shelflex 6702 | DMB 1200.1 | | Set Feed rates to material hoppers to match DLZ formulation |
| Zinc Stearate | Dowlex 2045 | | Set Both Screw Speeds - RPM's and AMP Draws |
| Pigment | Pigment | | Trim part to 68–78" width - Part Dependent! Verify color is correct - Sample - test w/MacBeth to OEM |
| Match Materials to physical specification on supplier C&C - verify criteria | | | Verify Top Layer thickness - 0.5–.8 mm, Bottom Layer - 1.2–1.5 mm |
| Sheeting Line Set Sheeting line up to match Process Parameters for DLZ FOR EXAMPLE | | | Vac Forming Set Fomer to match Process Parameters for DLZ FOR EXAMPLE |
| Line Speed - FPM | | | Blank Length - 90" |

Vehicle Flooring - Two Layers (continued)

| | |
|---|---|
| Roll Stack Gap - 1.7–2.0 mm Thickness criteria | Material Oven Dwell - 50 seconds |
| Roll stack temperatures - top–bottom 210–240 F. | Material Maximum Temperature - 350 F. Top Oven - 100% Bottom Oven - 50–80% |
| Foam or Fiber Attachment | Water Jet or Trimming |
| Attach OEM desired component | Trim part to OEM criteria on OEM vehicle drawings |
| Apply adhesive attach fiber | Set cycle time to match one step flow of process |
| FOR FOAM - Set Up to DLZ Parameters | Attach clips, etc. |
| Material Tempratures - 85–100 F. | Remove excess material and place in recycling |
| Material Ratio 0.95–1.1 | Verify proper cut and clean part as required |
| Shot Size - 4–10 Seconds | |
| Inspect and Ship | |
| Verify part matches all OEM criteria Place part on trimming inspection buck to verify trimming operation Label product accordingly Place part in shipping container Transfer to shipping Ship product | |

EXAMPLE 3

The following illustrates a method of producing a vehicle interior trim panel having two layers of recyclable material, according to embodiments of the present invention.

Trim Panel - Two Layers

| Inspect & Receive Raw Materials | | Transfer Materials | Compounding Coextruder |
|---|---|---|---|
| Bottom Layer (used w/o foam) DE 200.01 | Top Layer DE 200.01 DE 201.01 | Laminate PP or PE Foam | Set Extruder up to match Process Parameters for Tuf Trim FOR EXAMPLE Set both Extruder Zone Temperatures - 330–440 F. |
| Inspire 112 | Inspire 112 | Substrate | Die Zones - 330–380 F. |
| H700-12NPH | H700-12NPH | Poy-propylene | Set Die Gap to meet 1.7–2.0 mm sheet thickness criteria |
| CaCO3 | DMB 1200.1 | | Set Feed rates to material hoppers to match DLZ formulation |
| Shelflex 6702 | Dowlex 2045 | | Set Both Screw Speeds - RPM's and AMP Draws |
| Zinc Stearate | Pigment | | Trim part to 28–42" width - Part Dependent! Verify color is correct - Sample - test w/MacBeth to OEM |
| Match Materials to physical specification on supplier C&C - verify criteria | | | Verify Top Layer thickness - 0.5--8 mm, Bottom Layer - 1.2–1.5 mm (w/o foam) |
| Extruder | | Injection Molding | |
| Load reinforced | | Load appropriate for | Compression Molding |
| polypropylene Set Die Gap to meet 1.7–2.0 mm Set Feed rates to material | | OEM part Set shot size accordingly Load polyprpylene substrate material | (used w/sheet laminate) Use appropriate tool for desired product Run sheet from laminating operation to Compression Mold |
| Set Both Screw Speeds | | | Load desired tool for part to compression equipment |
| RPM's and AMP Draws | | | Set up appropriate pressures and temperatures to match part |
| Sheeting Line w/Laminating Set Sheeting line up to match Process Parameters for Tuf Trim FOR EXAMPLE | | | Vac Forming or Compression Molding FOR EXAMPLE |
| Line Speed - FPM | | | Vac Forming (used w/injection) |
| Roll Stack Gap - 1.7–2.0 mm Thickness criteria | | | Blank Length - 45–60" - OEM Part dependent |
| Roll stack temperatures - top–bottom 210 –240 F. Load Polypropylene Foam Laminate (if no bottom layer) | | | Material Oven Dwell - 50 seconds Material Maximum Temperature - 280 F. Spray injection substrate with appropriate glue Dry glue to specified parameters Use appropriate tool for desired product - lead correct substrate from injection |
| Water Jet or Trimming | | Assembly | Inspect and Ship |
| Trim part to OEM criteria on OEM vehicle drawings Set cycle time to match one step flow of process | | Add OEM desired components Use error proofing to verify component build | Verify part matches all OEM criteria Label product accordingly |
| Attach clips, etc. | | Attach sound proofing material as needed | Place part in shipping container Transfer to shipping |
| Remove exces material and place in recycling Verify proper cut and clean part as required | | | Ship product |

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A vehicle interior article, comprising a layer of recyclable polymeric material that comprises:
   an interpolymer component having a composition of about sixty to eighty percent (60%–80%) ethylene and about twenty to forty percent (20%–40%) aromatic vinyl monomer;

a polypropylene/ethylene copolymer component; and a polypropylene component;

wherein the interpolymer component is at least about thirty eight percent (38%) by weight;

wherein the polypropylene copolymer component is at least about one percent (1%) by weight; and wherein the polypropylene component is at least about five percent (5%) by weight.

2. The vehicle interior article of claim 1, wherein the layer of recyclable polymeric material further comprises a filler component.

3. The vehicle interior article of claim 1, wherein the filler component comprises limestone and barium sulfate components, wherein the limestone component is at least about twenty five percent (25%) by weight; and wherein the barium sulfate component is at least about five percent (5%) by weight.

4. The vehicle interior article of claim 1, wherein the layer of recyclable polymeric material has a thickness of between about 1.6 mm and about 2.0 mm.

5. The vehicle interior article of claim 1, wherein the polypropylene component has a melt index of about 12.

6. The vehicle interior article of claim 1, further comprising a backing layer attached to the layer of recyclable polymeric material in face-to-face contacting relationship therewith.

7. The vehicle interior article of claim 6, wherein the backing layer comprises an open cell material.

8. The vehicle interior article of claim 1, further comprising a layer of polypropylene foam attached to the layer of recyclable polymeric material in face-to-face contacting relationship therewith.

9. The vehicle interior article of claim 8, further comprising a reinforced, polypropylene substrate attached to the layer of polypropylene foam in face-to-face contacting relationship therewith.

10. The vehicle interior article of claim 6, further comprising a reinforced, polypropylene substrate attached to the backing layer in face-to-face contacting relationship therewith.

11. The vehicle interior article of claim 1, wherein the vehicle interior article comprises automotive interior flooring.

12. The vehicle interior article of claim 1, wherein the vehicle interior article comprises automotive interior trim.

13. A method of producing a vehicle interior article, comprising:

providing a layer of recyclable polymeric material comprising:

an interpolymer component having a composition of about sixty to eighty percent (60%–80%) ethylene and about twenty to forty percent (20%–40%) aromatic vinyl monomer;

a polypropylene/ethylene copolymer component; and a polypropylene component;

wherein the interpolymer component is at least about thirty eight percent (38%) by weight;

wherein the polypropylene/ethylene copolymer component is at least about one percent (1%) by weight; and wherein the polypropylene component is at least about five percent (5%) by weight; and forming the layer of recyclable material into a desired shape.

14. The method of claim 13, further comprising providing a layer of recyclable polymeric material comprising a filler component.

15. The method of claim 14, wherein the filler component comprises limestone and barium sulfate components, wherein the limestone component is at least about twenty five percent (25%) by weight; and wherein the barium sulfate component is at least about five percent (5%) by weight.

16. The method of claim 13, wherein the polypropylene component has a melt index of about 12.

17. The method of claim 13, wherein the layer of recyclable polymeric material has a thickness of between about 1.6 mm and about 2.0 mm.

18. The method of claim 13, further comprising attaching a backing layer to the layer of recyclable polymeric material in face-to-face contacting relationship therewith prior to the forming step.

19. The method of claim 18, wherein the backing layer comprises an open cell material.

20. The method of claim 13, further comprising attaching a layer of polypropylene foam to the layer of recyclable polymeric material in face-to-face contacting relationship therewith prior to the forming step.

21. The method of claim 20, further comprising attaching a reinforced, polypropylene substrate to the layer of polypropylene foam in face-to-face contacting relationship therewith prior to the forming step.

22. The method of claim 19, further comprising attaching a reinforced, polypropylene substrate to the backing layer in face-to-face contacting relationship therewith prior to the forming step.

\* \* \* \* \*